US012643042B2

(12) United States Patent
Bean et al.

(10) Patent No.: US 12,643,042 B2
(45) Date of Patent: Jun. 2, 2026

(54) PERSONALIZED AVATAR SYSTEMS AND METHODS

(71) Applicant: Sony Interactive Entertainment Inc., Tokyo (JP)

(72) Inventors: Celeste Bean, San Mateo, CA (US); Yayoi Ukai, San Mateo, CA (US)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 158 days.

(21) Appl. No.: 18/482,677

(22) Filed: Oct. 6, 2023

(65) Prior Publication Data

US 2025/0114699 A1 Apr. 10, 2025

(51) Int. Cl.
*A63F 13/53* (2014.01)

(52) U.S. Cl.
CPC ...... *A63F 13/53* (2014.09); *A63F 2300/5553* (2013.01); *A63F 2300/6607* (2013.01)

(58) Field of Classification Search
CPC ........ A63F 13/53; A63F 13/537; A63F 13/58; A63F 2300/5553; A63F 2300/6607
USPC .......................................................... 463/31
See application file for complete search history.

(56) References Cited

U.S. PATENT DOCUMENTS 9,508,197 B2 * 11/2016 Quinn ...................... G06T 19/20
10,621,417 B2 * 4/2020 Owens ................. G06V 40/169

11,229,849 B2 1/2022 Blackstock et al.
11,688,129 B2 * 6/2023 Tran ...................... A61B 5/1128
                                            345/420
2009/0044113 A1 2/2009 Jones et al.
2017/0080346 A1 * 3/2017 Abbas ...................... A63F 13/79
2022/0230379 A1 * 7/2022 Shriram ................ G06F 3/0482

FOREIGN PATENT DOCUMENTS

WO 2015008042 A1 1/2015

OTHER PUBLICATIONS

"Decrypt Learn: What Are Non-Fungible Tokens (NFTs)", Available Online at: https://www.youtube.com/watch?v=0gXW&L eDp4M, Jan. 13, 2022 (video not attached).
PCT Application No. PCT/US2024/049433 , International Search Report and Written Opinion, Mailed On Feb. 6, 2025, 11 pages.

* cited by examiner

*Primary Examiner* — Allen Chan
(74) *Attorney, Agent, or Firm* — Kilpatrick Townsend & Stockton LLP

(57) ABSTRACT

Methods and systems for personalizing an avatar for a user for use in a game includes extracting features of the avatar associated with the user. Receiving inputs from the user for customizing at least a feature of the game that is identified as customizable. Constraints of the game are determined and used during updating of a skin of the avatar, wherein the skin of the avatar is updated by adjusting the feature to include the attribute customized using the inputs of the user. The updated skin used to generate an updated avatar that is stored in a user profile of the user and used to represent the user in the game.

20 Claims, 4 Drawing Sheets

Figure 4:
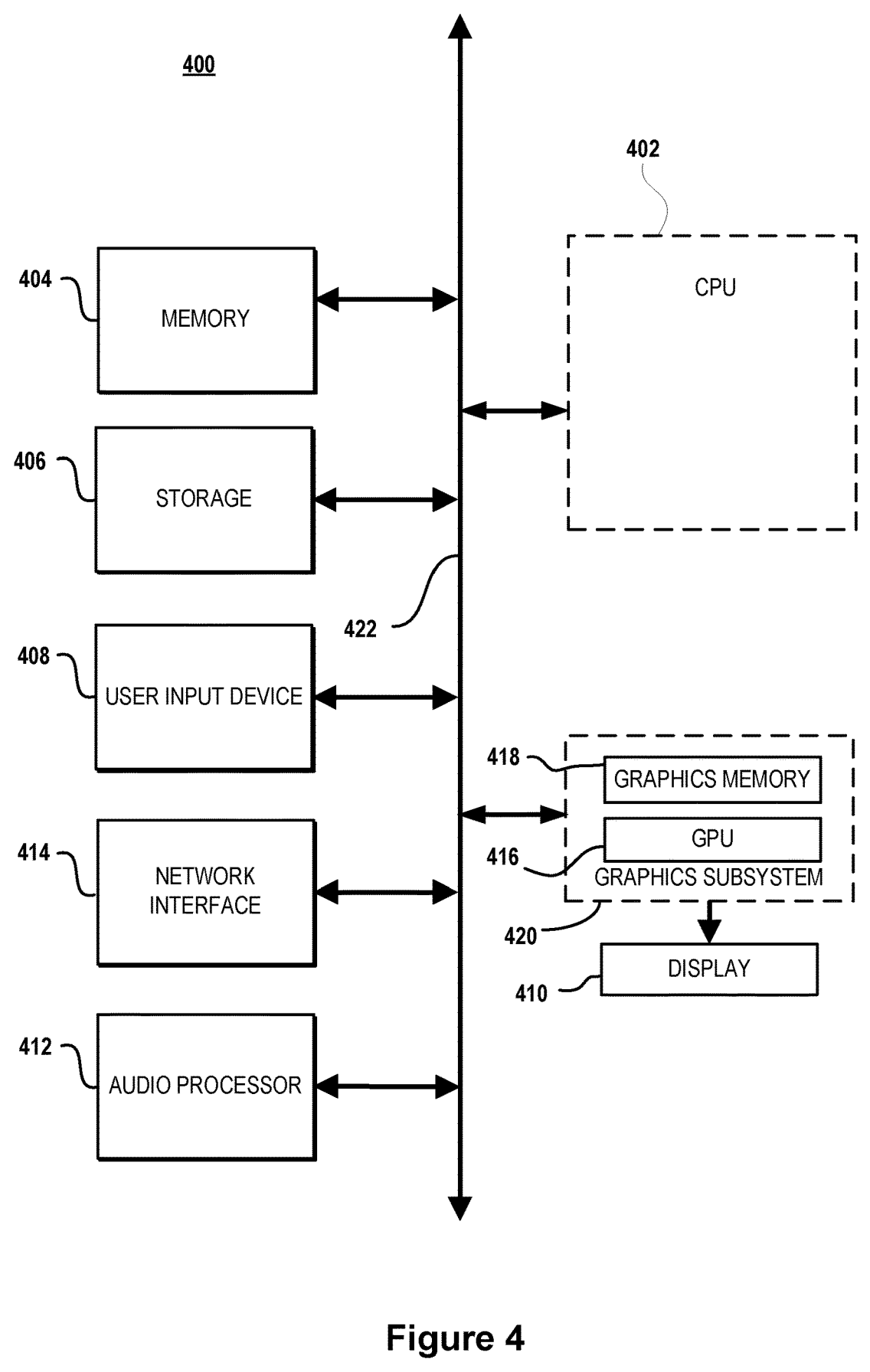

400

402

404    MEMORY

406    STORAGE

422

408    USER INPUT DEVICE

414    NETWORK INTERFACE

412    AUDIO PROCESSOR

CPU

418    GRAPHICS MEMORY

GPU

416

GRAPHICS SUBSYSTEM

420

DISPLAY

PERSONALIZED AVATAR SYSTEMS AND METHODS

BACKGROUND OF THE INVENTION

1. Field of the Invention

The present disclosure relates to processing inputs from a user to generate avatars for use to represent a user and more specifically to generate customized avatars for the user that are constrained to game limits of a video game.

2. Description of the Related Art

User interaction with online content has become mainstream with a variety of content being presented or generated for user consumption. Of particular interest is the growing popularity of video games. A user selects a video game for playing and provides game inputs to affect a game state of the video game and to update game data. The updated game data is used to generate game scenes that are returned to the client device for rendering. In the video game, the user usually selects an online personality to represent themselves in the video game. The online personality selected by the user is already predefined by the game logic and provided as selectable options in the video game. The video game does not provide any options to allow the user to customize the predefined online personalities. Further, the user is unable to transport the online personality that they chose in the game to another game or another interactive application. Each interactive application (e.g., video game) that the user selects to interact with provides its own selections of online personalities and does not allow the user to customize or transport their online personality from one interactive application to another.

It is in this context that embodiments of the invention arise.

SUMMARY OF THE INVENTION

Implementations of the present disclosure relate to systems and methods for personalizing an online personality (i.e., digital representation or avatar) for representing the user in a video game. For simplicity sake, the various implementations will be described with reference to a video game (simply referred to as "game") but can be extended to the interactive application. The avatar used for customization may already be associated with the user or generated from an image of the user captured using one or more image capturing devices, or generated from a picture of an icon or character provided by the user. The avatar is customized using details provided in the user inputs and in accordance to any constraints (game limits) of the game. The user inputs identify one or more features of the avatar and attributes to customize the one or more features. The customized avatar of the user includes features that distinctly identify the user in the game. The customized avatar is associated with the user and stored in a user profile of the user. The customized avatar of the user can be used to represent the user in different interactive applications.

The avatar customized in the game can be transported to and used in another interactive application to distinctly identify the user in the interactive application. An avatar personalization module executing on a processor of a system used to interact with the game is engaged in the transportation of the avatar of the user that was generated and customized in the game to a second game. The avatar personalization module identifies a character or an avatar in the second game to which the features of the customized avatar can be transferred and maps the features of the identified character in the second game to the corresponding features of the avatar in the game. The avatar in the second game may be selected by or for the user. The mapping is used to update the attributes of the relevant features of the character in the second game to match with the customized attributes of the corresponding features of the customized avatar in the game. The updates are done in accordance to constraints specified in the second game. The constraints of the second game specify an extent to which each of the features of the select ones of the features of the character can be adjusted during customization and game limits of the second game. The constraints and game limits identify the performance requirements of each character and any compatibility issues that needs to be addressed. The character thus customized to include the distinguishing feature is used to distinctly identify the user in the second game. The customized character complies with or are adjusted to comply with the constraints of the second game/interactive application while continuing to maintain the distinctive features that represent the user. The customized character is maintained separately in the user profile of the user and used as appropriate, based on the requirements/constraints of the selected interactive application.

The transporting of the avatar between different interactive applications allows the user to maintain a distinctly identifiable and consistent identity across different interactive applications or platforms. The skin of the customized avatar of the user generated in one interactive application can be used to automatically update to a character identified in the second interactive application so that the character with the customized skin has the look and physical appearance that are distinguishable and match the brand established by the user via customization. This allows the user to express themselves across various interactive applications and platforms, enabling them to have an immersive and satisfying experience. The updates to the character can be further adjusted to the requirements of the second game so that the updated character does not have any compatibility issues. For example, if the game requirements of the second game require the user to show a strong personality, some of the features of the character are automatically adjusted so that the resulting character of the user in the second game exhibits the strong personality in addition to rendering the customized features. The constraints of the interactive application ensures that the look and feel of the avatar customized by the user meets the requirements of the interactive application while the avatar blends in with the environment of the interactive application.

The avatar customized with inputs from the user can be protected using blockchain. The blockchain allows the user to create a secondary market from within the interactive application (e.g., a game) or outside of the interactive application (i.e., in external marketplaces) for the user to buy and sell their custom avatars. The customizing of the avatar gives the user a way to express themselves within the game and the blockchain technology allows the user to protect their customized avatars by ensuring that the ownership rights of the user are clearly defined and are transferable, making the task of buying and selling the customized avatars secure.

In one implementation, a method for personalizing an avatar for a user for use in a game, is disclosed. The method includes extracting features of the avatar associated with the user and identifying one or more of the extracted features of the avatar that are customizable. Inputs to customize at least one feature of the avatar are received from the user. The inputs identify an attribute associated with the feature and customization of the attribute associated with the feature. The feature with the attribute customized using the inputs of the user making the avatar distinguishable and the user associated with the avatar distinctly identifiable in the game. The feature with the customized attribute being designated as a hallmark feature of the avatar. Constraints of the game are identified, wherein the constraints define limits for customizing each feature of the avatar. The limits are established based on compatibility requirements of the game. A skin of the avatar is updated by adjusting the feature to include the attribute customized using the inputs of the user, wherein the extent of adjustment to the attribute is in accordance to the constraints of the game. The update to the skin results in the generation of an updated avatar. The updated avatar of the user is stored in a user profile of the user and used to distinctly represent the user in the game.

In another implementation, a method for personalizing an avatar for a user for use in a game, is disclosed. The method incudes receiving a request to transport the avatar of the user customized in a first game to a second game. The avatar of the user is analyzed to identify at least one attribute of a feature that is customized using inputs from the user. The feature with the at least one customized attribute results in the avatar being distinguishable and the user associated with the avatar distinctly identifiable. The feature with the at least one customized attribute is designated as a hallmark feature of the avatar. The avatar customized in the first game is transported to the second game, in response to the request. The transporting of the avatar includes updating the hallmark feature of the avatar in the first game to a corresponding feature of a character identified to represent the user in the second game. The feature of the character updated to include the at least one attribute of the hallmark feature rendering the character distinguishable and the user distinctly identifiable in the second game. The feature of the character with the customized attribute designated as the hallmark feature of the character in the second game. The hallmark feature of the character is dynamically adjusted to comply with constraints of the second game so that the character meets requirements of rendering in an environment of the second game.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

The disclosure may be better understood by reference to the following description taken in conjunction with the accompanying drawings.

Figure 1:
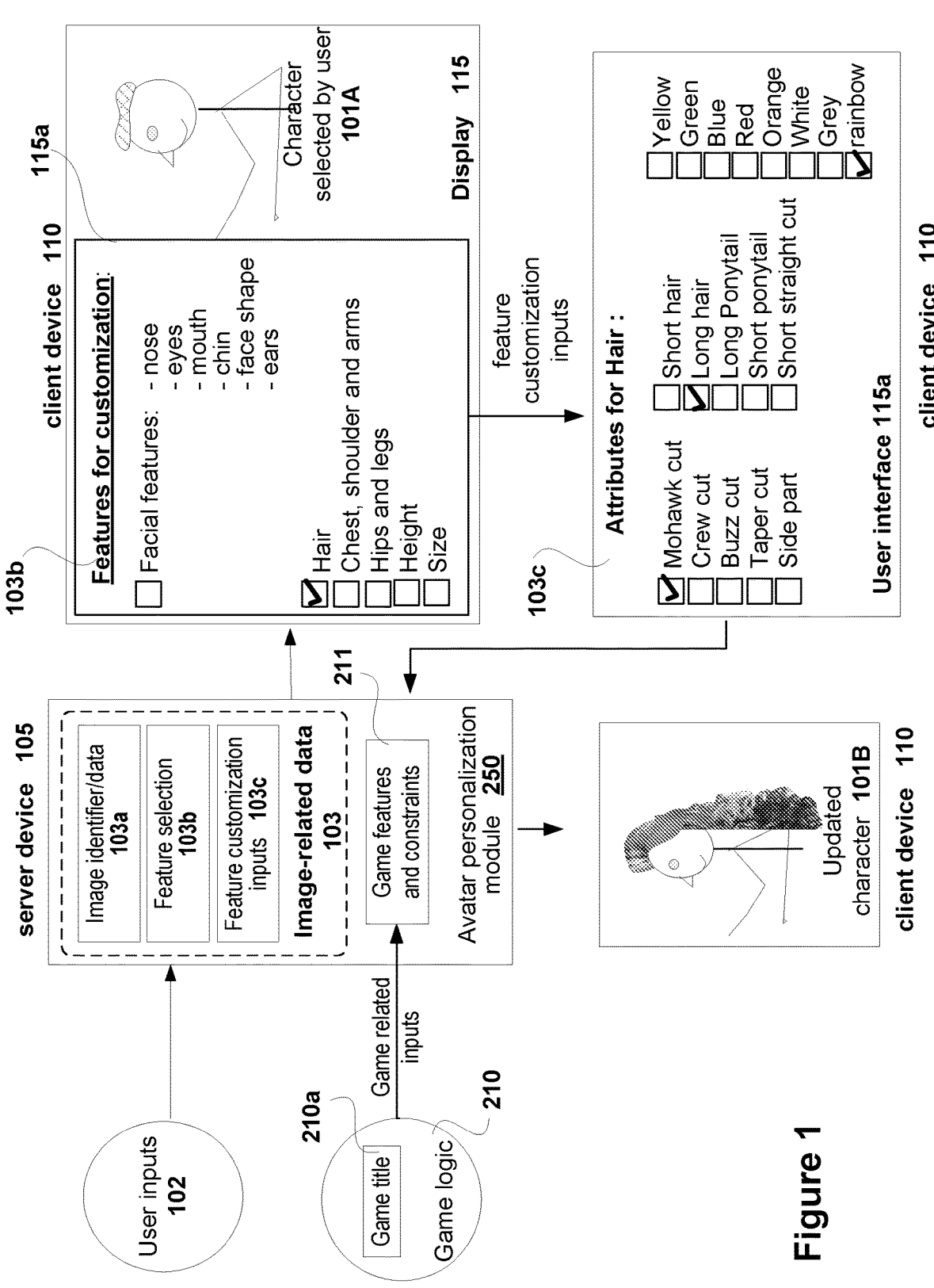
FIG. 1 represents an overview of a simplified block diagram of a system that is used for providing inputs to personalize an avatar of a user for use in a game, in accordance with one implementation.

4 various aspects of the features used to classify and prioritize the customization of various features, in accordance with one implementation.

FIG. 4 illustrates components of an example system that can be used to process requests from a user, provide content and assistance to the user to perform aspects of the various implementations of the present disclosure.

DETAILED DESCRIPTION

Broadly speaking, implementations of the present disclosure include systems and methods for receiving user inputs from a user to personalize an avatar used to represent the user in an interactive application, such as an online video game, and updating the avatar using the user inputs. The updates are done in accordance to constraints specified for the video game. The constraints define the game limits and game requirements of the game to ensure that the customization of the avatar will be compatible when used in the game and will not cause any performance or compatibility issues. The user inputs identify one or more features of the avatar and the attributes of the one or more features that the user has selected to customize. The changes to the attributes of the feature provided in the user inputs are applied to the avatar of the user resulting in the generation of an updated avatar. The changes to the attributes are applied after verifying that the changes are compatible with the game requirements of the game and are for features that are identified to be customizable in the game. The compatibility with the game requirements is to ensure that the changes to the features do not cause any performance or compatibility issues. The updated avatar is associated with the user and stored in a user profile of the user and used to provide consistent identity for the user across different games or interactive applications or platforms. As the updated avatar of the user is transported to different games or platforms, the features customized in the updated avatar are automatically adjusted to match with the game requirements and to comply with any constraints of the game or platform to which the updated avatar is being transported so that the look and physical appearance of the features of the updated avatar make the updated avatar distinguishable in an environment of the game or the platform while meeting the requirements of rendering in the game environment or the platform.

An avatar selected by the user to represent themselves in a video game is analyzed and the features are extracted from the selected avatar. The video game is analyzed to identify the customizable features of the avatar and determine the constraints and game limits of the game. The constraints identify the extent of customization that can be done to each customizable feature, limits of an environment where the avatar is to be used and physical requirements of the avatar in the environment. The customizable features of the avatar presented to the user for user selection and customization. User inputs identifying changes to attributes of one or more of the select ones of the features are received and verified to ensure that the changes to the attributes are within the constraints of the game and do not exceed the game limits. Upon successful verification, the user inputs are used to update the attributes of the select ones of the features of the avatar to generate an updated that is customized in accordance to the constraints and requirements of the game and/or platform. The customized feature can make the updated avatar distinguishable and the user associated with the updated avatar distinctly identifiable in the game. The updated avatar is transported to other interactive applications selected by the user, including video games, social media applications, etc.

With the general understanding of the disclosure, specific implementations of using user inputs to personalize an avatar of a user to include distinctive characteristics (i.e., features) that can be used to uniquely identify the user in the interactive applications will now be described in greater detail with reference to the various figures. It should be noted that various implementations of the present disclosure can be practiced without some or all of the specific details. In other instances, well known process operations have not been described in detail in order not to unnecessarily obscure various embodiments of the present disclosure.

FIG. 1 represents a simplified block diagram of a system used for receiving and processing user inputs 102 provided by the user to customize an avatar representing the user in a video game or other interactive application, in accordance to some implementations.

Figure 2:
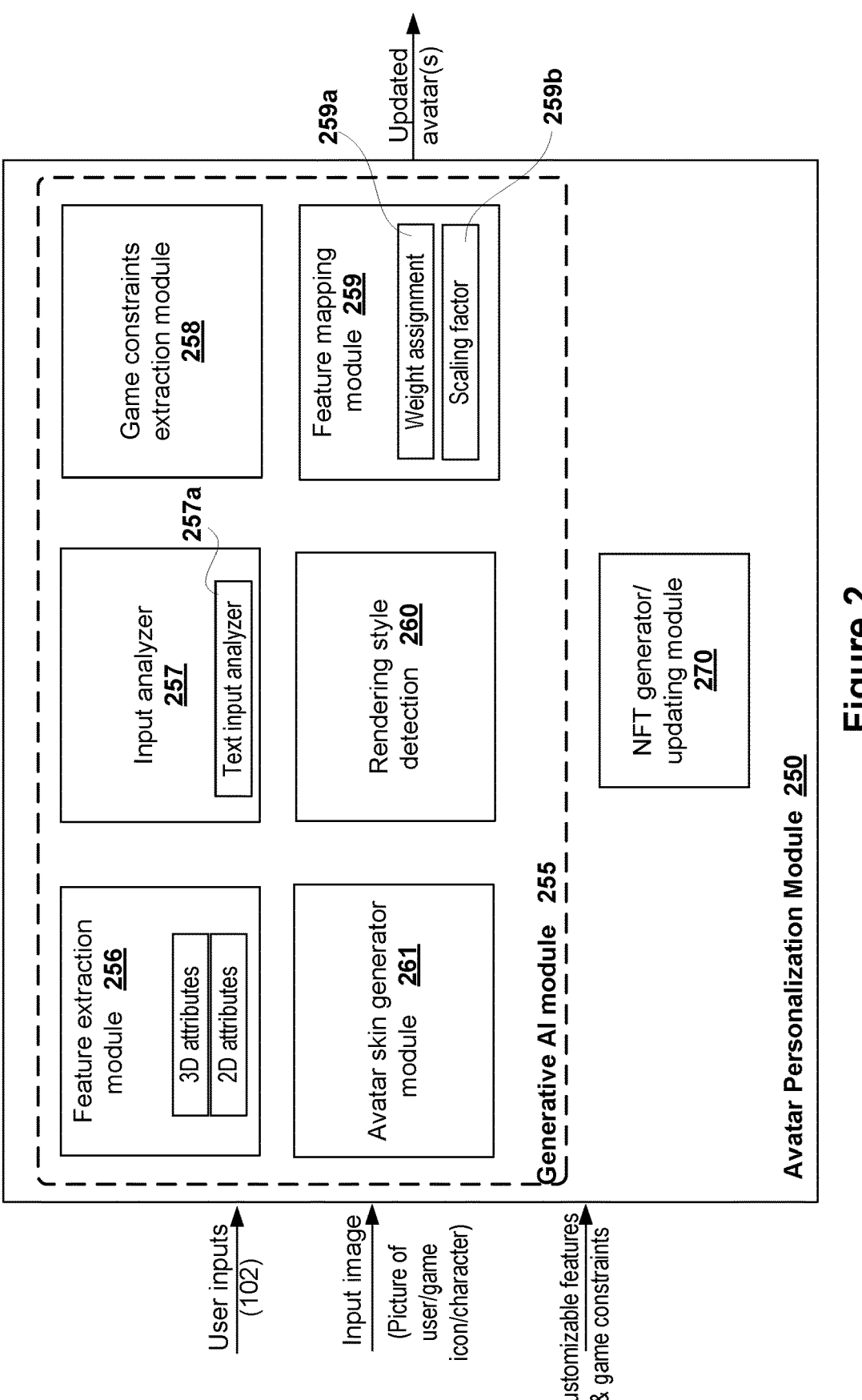
FIG. 2 represents a simplified block diagram of various sub-modules of an avatar personalization module used for personalizing an avatar of the user, in accordance with one implementation.

FIG. 2 illustrates various sub-modules within an avatar personalization module 250 used for receiving and processing the user inputs for customizing the avatar (i.e., character or an image) of the user, in some implementations. The customized avatar is used to represent the user in the game. Responsive to receiving the user inputs 102, the avatar personalization module 250 is used to obtain game constraints and requirements using a game title 210a of a game where the avatar of the user is to be used, and customize one or more features of the avatar using the user inputs to generate an updated and customized avatar for distinctly identifying the user in the game. Based on the type of customization done to the different features, these customized features make the avatar of the user distinguishable and unique. The customization can be done by the user to establish a brand for themself. The various implementations will be discussed below in detail by simultaneously referring to FIGS. 1 and 2.

The user inputs 102 generated at the client device 110 are forwarded to the server device 105 for processing. The user inputs 102 can include an identity of an image or character (103a) that the user wishes to use as the avatar to represent the user in the video game and customizing inputs 102 to customize different portions of the image. The image can be of the user captured using image capturing devices (not shown) disposed in a real-world environment in which the user is operating or may be a user's picture or image provided by the user. In some implementations, the image of the user can be processed by an image processing program, such as a cartoon generation program, for example, to generate a cartoon character version of the user for use as the avatar. In other implementations, the identity of the image (103a) provided by the user can be of a game icon or a game character available within or usable in the game, and selected by the user to represent themself in the game. In other implementations, the identity of the image (103a) provided by the user can be of an animated or cartoon character or of a fictitious or mythical character/entity retrieved (i.e., obtained) from the Internet using an online link included in the user inputs 102. In some implementations, instead of receiving a selection of an image of a character, an avatar (e.g., a game character) that is already associated with the user in the game may be identified in the user inputs 102 using a character (or image) identifier (103a). In some other implementations, instead of a character, the user can select an image of an object, such as a specific type of car or an image of an animal or an image of an inanimate object, to represent them in the game, wherein the object may or may not already be associated with the user. The image or object selection or character identification is forwarded to an avatar personalization module 250 to be customized using the user inputs 102 provided by the user. The customized character represents a brand of the user and is used as an avatar to represent the user in the game.

In some implementations, the avatar personalization module 250 can be executing on the server 105 that is also executing an instance of the game. In other implementations, the avatar personalization module 250 can be executing on a different server 105 than the server executing the instance of the game. In either of these implementations, the server 105 may be remotely located from the client device 110 and may be part of a cloud system with access provided to the server executing the avatar personalization module 250 and/or an instance of the game over a network, such as the Internet. Alternatively, the avatar personalization module 250 and instance of the game can both be executing on a game console that is local to the user and communicatively connected to each other to exchange relevant data for customizing the avatar. The image of the user or the image provided by the user can be a two-dimensional (2D) representation or a three-dimensional (3D) representation. and, consequently, the features can be identified using 2D or 3D coordinates.

The character or the image of an object selected by the user to represent themselves in the game includes a plurality of features (103b) that can be selected for customization. A feature extraction module 256 within the avatar personalization module 250 is used to analyze the identified character or image (e.g., game icon, game character, cartoon character, an antique car, a futuristic car, etc.), to identify the various features included within and extract details of the identified features. As the image of an object or character used to represent the user can be a 2D representation or a 3D representation, the feature extraction module 256 can identify and extract details of the features, including the 2D or 3D coordinates of each feature of the avatar.

In addition to identifying the features, the avatar personalization module 250 queries a game datastore (not shown) to obtain details of the game in which the customized avatar is to be used. The game datastore is a repository used to store game logic 210 of a plurality of games available to the user for interaction. An instance of the game logic 210 can be executed on a server by a game engine (not shown), which provides the software framework for execution of the game. Game inputs provided by the user during play are used by the game logic to update a game state of the game and to generate game scenes (i.e., game environment), which include game objects and game characters. The game scenes are returned to the client device 110 for rendering.

The avatar personalization module 250 engages a game constraints extraction module 258 to query the game datastore using a game title 210a or a game identifier of the game in which the customized avatar of the user is to be used to represent the user, and retrieve game related inputs. The game title 210a or game identifier may be provided in the user inputs. The game related inputs identify customizable features of an avatar that can be used to represent the user, and game limits and game constraints 211 of the game. It should be noted that not all the features identified in the avatar (e.g., a character) may be available for customization, and the game features retrieved for the game identify specific ones of the features of the avatar that are allowed to be customized in the game. Consequently, the list of features that are identified as customizable (103b) can be game-specific and/or character-specific, wherein the character used to define an avatar for representing the user can be a digital character defined from an image or icon or game-related character or an object or entity (i.e., a digital object or digital entity). For instance, all of the features of the character may be available for customization in a first game and only select ones of the features of the character may be available for customization in a second game (i.e., an interactive application that is different from the first game). Similarly, when an object is used as an avatar, all of the features of the object may be available for customization in the game, whereas when a character is used as the avatar, select ones of the features of the character may be available for customization in the game. A game constraints extraction module 258 is used to extract the game features and constraints 211 defined for the game, wherein the game features and constraints 211 identify specific ones of the features of the avatar that are customizable in the game. For example, the game features and constraints 211 of the game may identify the features, such as hair, facial features, shoes, of a character as customizable (103b). In such implementations, the feature extractions module 256 can work with the game constraints extraction module 258 to use the customizable features to identify certain other features, such as clothes worn, skin color, height, size, etc., of the character that are not customizable. Information related to the customizable and non-customizable feature are used to verifying the features included in the user inputs prior to customizing those features to generate the updated avatar.

The game constraints retrieved for the game identify the type of customization that can be done for each of the customizable features. The game constraints are provided to ensure that the customization is compatible with the requirements of the game. For instance, if the hair feature is one of the customizable features, the game constraints may specify that any customization to the hair feature has to relate to short hair and not long hair. This may be to match to the style observed in the environment (i.e., to match the look or feel) or may be to ensure the safety of the avatar as the avatar navigates within the game (e.g., the length of the hair does not cause the hair to get entangled in the where the avatar is working with heavy equipment). In another example, the game constraints for the hair feature may require the hair to be tied in a ponytail and not hang loose as the user may have to be interacting in an intense environment that needs the avatar of the user to have a clear view of the game environment in all directions and the loose hair may result in blocking the view of the game environment for the user.

The game limits can define the extent to which the attributes of each feature can be adjusted during customization of the character, for example. The game limits can work with the game constraints to further define the attributes and the level of customization that can be done to the different attributes identified for each feature of the character, wherein the level of customization of the attributes is specified in accordance to the environment of the game in which the character is being used. For instance, in the above example where the hair feature is being customized for the character, the game limits of the game can identify the attributes pertaining to the hair (e.g., hair length, hair color, intensity of color, hair style, etc.), and specify the level to which the identified attributes can be adjusted during customization of the character in the game. The game limits can vary from one game scene to the next within the game and, consequently, in some implementations, the one or more attributes used for customizing the feature can be dynamically adjusted in accordance to the changes detected in the game scenes during play of the game, so that the customized character (i.e., avatar) of the user can meet the rendering requirements of the environment in which the character is being used in the game and the behavioral requirements specified for the character representing the avatar of the user.

An input analyzer module 257 is used to analyze the user inputs 102 provided by the user to identify the character (101A—i.e., representing the avatar) that is being customized and the features that are used for customizing the character (103a). The character 101A is identified to correspond with the image identifier 103a included in the user inputs 102. The features that are identified as customizable (103b) for the character (i.e., image-related data 103) are presented on a user interface 115a rendered at a display 115 of a client device 110, for user selection and customization. FIG. 1 identifies the customizable features (103b) that are specific to the character used for representing the user and correspond to the image identifier (103a) included in the user inputs 102 that are presented as selection options on the user interface 115a. For instance, as shown, the character selected to represent the user can be a game icon or a game character or a fictional character or a cartoon character or an image of the user, and the customizable features of the character identified from the game features and constraints (211) extracted for the game can include facial features, hair, chest, shoulder and arms, hips and legs, height, size, to name a few. If, however, the image selected for representing the user is an object, such as a fancy or antique car, the customizable features may include the different aspects (i.e., physical as well as descriptive aspects) of the car, such as style, make, model, color of the hood, color of the body, style of the door, wheels, etc. User can select one or more features (103b) of the image (103a) rendered at the user interface 115a to customize and provide customization inputs for the selected features (103b). Responsive to user selection of a specific feature for customizing at the user interface 115a, the user interface 115a is dynamically updated to render selection options of various attributes (103c) associated with the specific feature. In the example illustrated in FIG. 1, responsive to the user selection of the hair feature at the user interface 115a, the user interface 115a is dynamically updated to include the various attributes (103c) for the selected hair feature (103b) as selection options, wherein the attributes (103c) can correspond with the hair style or cut, hair length, hair color, etc. Although various implementations are described with reference to user selecting a single feature for customizing the user's avatar, the user can provide inputs by identifying and selecting two or more features from the user interface 115a. Responsive to user selection of the two or more features, the user interface 115a is automatically updated to include selection options for attributes of corresponding to the two or more features. The user can select one or more of the attributes selection options for each customizable feature provided at the user interface 115a and the user selected options are used to update the corresponding feature(s) of the character (101A) of the user to generate the updated character (i.e., updated avatar).

User selection of the relevant attributes is detected by the input analyzer module 257 within the avatar personalization module 250 and used to customize the image representing the avatar of the user. The customization includes applying the attributes selected for the identified feature(s) of the character representing the avatar (101A) of the user and generating an updated avatar (i.e., updated character) 101B with the selected features customized in accordance to the user inputs 102. In the example illustrated in FIG. 1, the user has selected the mohawk cut, the long hair and the rainbow attributes for the hair feature, as shown by the check marks at the respective attributes' options on the user interface 115*a*. The attributes are updated to the relevant features of the avatar (101A) in accordance with the game constraints identified for the game to generate the updated avatar (101B), wherein, in the example shown in FIG. 1, the hair of the updated avatar 101B includes a mohawk cut top and long hair that are in rainbow colors. The features of the avatar 101A are updated so as to replace any original attributes (e.g., hair and/or headwear exhibited by the avatar 101A) with the selected attributes. In the example of FIG. 1, the cap worn by the avatar 101A is replaced with the rainbow colored mohawk cut top and long hair. In some implementations, when the constraints of the game extracted by the game constraints extraction module 258 indicate that the avatar should not have long hair, then the length of the hair in the updated avatar 101B is dynamically adjusted to be short, to comply with the constraints, while continuing to sport the mohawk cut top. Both the mohawk cut top and the short hair are rendered in rainbow colors.

The selected attributes applied to the hair feature can by itself make the user associated with the updated avatar distinctly identifiable. Alternately, the selected attributes of the hair feature along with other customized attributes of the hair feature or a different feature, such as one or more facial features, can make the user of the updated avatar distinctly identifiable. In the above example, when the color attribute of the selected hair feature is chosen to be sky blue and the environment in the game scene exhibits the skies having the same blue hue, then the color attribute of the selected hair feature is dynamically adjusted to exhibit a different shade of blue in the environment of the game scene so that the hair feature can be distinguishably identified in the game scene with sky blue skies. The color attribute of the hair feature reverts back to the sky-blue shade when the environment in which the updated avatar is being rendered does not include the blue skies, so that the color of the hair feature can be easily distinguishable. In some implementations, the distinguishing feature represents a salient feature as the feature includes customized attributes that make the avatar distinguishable and the user distinctly identifiable and, hence, is designated as a "hallmark" feature. The updated avatar of the user is stored in the user profile of the user and used to represent the user in the game.

In addition to providing the relevant attributes for the two or more features selected for customizing, a feature mapping module 259 is engaged to analyze the attribute(s) defining the type of customizing provided by the user for each feature of the avatar. The type of customization (i.e., attribute(s)) applied to a customized feature can determine the level of saliency of the feature in making the avatar distinguishable and the user distinctly identifiable in the game in comparison to other customized features. The level of salience determined for each customized feature is used to assign a relative weight to the feature. The more salient the customized feature is, the greater the weight assigned to that feature in comparison to the other features. A weight assignment sub-module 259*a* within the feature mapping module 259 is used to determine the saliency of each customized feature in comparison to other features and to assign the weight for the feature based on the saliency determined for the feature.

In some implementations, when more than one feature is selected for customizing, the proportion of each feature in relation to another feature is obtained from the user. The options provided at the user interface 115*a* can include relative proportion option, which when selected by the user allows the user to identify the features and their relative proportion to one another. The proportion may be part of the user inputs 102 provided, so as to get a feel for the relative value (e.g., a size or hue or position or movement) associated with a first feature with reference to a second feature. The relative proportions of two features, for example, can be used to properly scale the two features with respect to one another when updating the features of the avatar of the user so that the features maintain the relative proportions between the two features after customization. A scaling factor sub-module 259*b* within the features mapping module 259 is used to obtain the user inputs at the proportion options, identify the two features that pertain to the proportion options, and apply the attributes to customize the features while maintaining the relative scale of the two features.

Alternative to providing selection options of features and/or attributes for customizing the character representing the avatar of the user, in some implementations, the user interface 115*a* can include a textual input option (not shown) for providing text inputs, wherein the text inputs specify a particular feature the user would like to customize and/or specify preferences for the one or more attributes of the particular feature for customizing. The user can provide text inputs using a textual input option (e.g., a text or comment box) and the text inputs provided by the user are analyzed and interpreted by a text input analyzer 257*a* within an input analyzer module 257 to identify the particular feature and/or the attributes of the particular feature that correlates with the user's preferences. The selected feature of the avatar 101A is then adjusted by embedding the relevant attributes specified in the text inputs to generate the updated avatar 101B. Updating the avatar 101A includes updating a skin of the avatar by adjusting the attributes of the features included in the skin, in accordance to the user's preferences. The embedding of the attributes is done in accordance to the style defined in the game so that the adjusted feature is stylistically aligned with the rest of the environment of the game where the updated avatar is being rendered. In some implementations, the style may specify the resolution requirements of the game. Accordingly, the avatar is updated with the user-provided attributes of the selected feature (i.e., the hallmark feature) at the specified resolution, so that the resulting updated avatar aligns with the resolution of the environment of the game. In some implementations, the avatar personalization module 250 may generate different versions of the updated avatar, wherein each version of the updated avatar corresponds to a particular resolution. For example, the avatar personalization module 250 can generate a high-resolution updated avatar with the hallmark feature updated to match the high resolution, and a low-resolution updated avatar may be generated to include the hallmark feature that is updated to match the low resolution.

In some implementations, the attributes of the different features of the character can be received and used to update the features during initial setup of the game using the user inputs 102 and the game constraints and limits, and then dynamically adjusted during play of the game, based on changes detected in the game scenes. The dynamic adjustment to the customized features of the avatar is to make the customized avatar be compatible with the game environment in which the avatar is being rendered. For example, the hair feature of the character may be initially customized by the user to have a sky-blue colored mohawk cut and this customized hair feature can be used to easily identify the character in a game scene of the game that includes a dark room (e.g., dark basement of a building or a dark dungeon in a castle). However, as the user progresses in the game and the character (i.e., avatar) of the user moves from the dark dungeon to open air that is sunny with bright blue skies, the customized hair feature of the character may not be distinctly identifiable as the sky-blue color of the hair of the character (i.e., avatar) may match with the bright blue skies. In such cases, the avatar personalization module 250 is configured to dynamically detect the changes occurring in the environment, determine the attributes of the feature that were customized (e.g., the hair color of the hair feature) and level of changes (i.e., hue of the blue color) that were applied to the feature of the character, and dynamically adjust the sky-blue color attribute of the hair feature of the character representing the avatar of the user to a different shade within the blue spectrum, for example. The dynamic adjustment to the hair feature is done, so as to comply with the constraints of the game but yet maintain the distinguishable feature that can be used to distinctly identify the user. Such dynamic adjustment is made by, (a) tracking the progress of the user, (b) tracking the various characteristics of the game scene within the game in which the avatar of the user is being rendered, (c) obtaining the constraints 211 of the game scene, and (d) determining the amount of adjustment that has to be made to certain ones of the customized attributes of the features of the avatar.

Although the various implementations have been discussed with reference to customizing a single feature of an avatar using user inputs provided by the user, the various implementations can be extended to include customization of more than one feature based on user inputs selecting the different features and one or more attributes of each feature, wherein the customization is done to match not only the style but also the game constraints of the game, which includes physical constraints defined for the game character (i.e., avatar). For instance, a spiderman character cannot be modified to have loose clothing, even if the user inputs identify as such and the user inputs comply with game constraints, as the loose clothing would not be suitable for the spiderman activities. Consequently, if the user inputs identify attributes for a feature that is in conflict with the physical constraints specified for the character, then the user inputs applied to the attributes are dynamically adjusted so that the attributes for the selected feature comply with the physical constraints specified for the character and the game constraints of the game. In some implementations, when there is conflict between the user inputs to customize a particular attribute of a feature and the game constraints associated with the feature, the user inputs for customizing the particular attribute of the feature are ignored. Alternatively, the particular attribute of the feature is dynamically adjusted to comply with the game requirements and game constraints of the game.

The updated avatar of the user can be transported to other games and interactive applications to allow the user to maintain consistent identity across the different games, different interactive applications, and different platforms. In some implementations, the game constraints and/or game limits can vary from one game to another game or another interactive application. In such implementations, the avatar personalization module 250 is configured to detect such variations in the game constraints and/or game limits and take those variations into consideration when the avatar is transported from a first game where the avatar was customized to a second game or a new interactive application. The transportation of the avatar is done, in response to a request from the user, and the variations in the game constraints and game limits are considered and the attributes of the customized features dynamically adjusted in the second game (or the new interactive application) so that the adjusted and customized avatar in the second game complies with the constraints of the new environment and meets the requirements of the second game.

The avatar with the user's own personalization of a salient feature, for example, allows the user to define their own brand that they want to project and such personalization can be reproduced across different platforms and different interactive applications by transporting the avatar. The personalized avatar with the customized feature (i.e., salient or hallmark feature) are transported to the different interactive applications so that the customized feature(s) enable the overall customized avatar to comply with the physical constraints specified in the respective interactive applications. For example, if the user's avatar customized in a first game is being transported to a superman type of character in a new interactive application, any adjustments to the style of clothes (e.g., avatar sporting loose fitting clothes) that were done in the avatar at the first game, during customization, is transferred to the superman character of the user in the new interactive application. The style of clothes transferred to the superman character is dynamically adjusted so that the superman character is shown to be sporting clothes that fit like a second skin, per the physical requirements of the superman character in the new interactive application, and not the loose-fitting clothes defined at the first game. This way, the avatar personalization module 250 ensures that the behavior of the avatar in the new interactive application is not compromised and the physical activities of the superman character is not adversely affected.

As noted, the updated avatar with the customized features is generated for the game so as to stylistically align with the rest of the environment of the game. A rendering style detection module 260 is used to detect the style followed in the environment of the game, for example, and to generate the updated avatar with the customized feature(s) to match the style of the environment where the avatar is to be used. In some implementations, the style can relate to resolution of the customized avatar and the rendering style detection module 260 detects the environment to be rendering at a high-resolution. Consequently, the updated avatar with the customized hallmark feature is generated to render at high-resolution to match the rendering style of the environment (i.e., rendering at high-resolution). Similarly, if the environment is being rendered at low-resolution, the updated avatar is generated to render at low-resolution. In some implementations, the rendering style detection module 260 may generate multiple versions of the updated avatar, wherein each version of the updated avatar corresponds to a particular type of resolution. For example, the rendering style detection module 260 can generate a high-resolution updated avatar with the hallmark feature, and a low-resolution updated avatar with the hallmark feature. The different versions of the avatar are maintained separately in a user profile of the user and used in accordance to the rendering style of the environment where the avatar of the user is to be used.

An avatar skin generator module 261 is used to obtain the rendering style followed in the environment of the game and to adjust the updated features in accordance to the game constraints of the game. The adjusted features are used to generate an updated skin for applying to the avatar, wherein the updated skin is in accordance to the rendering style of the environment and the game constraints of the game. The updated skin can change based on the changes detected in the game during game play, allowing the user to have a more immersive experience. For example, if the avatar needs to exhibit a strong personality, the skin of the avatar is adjusted to change the look/feel and physical appearance in the game to reflect the game requirements and/or game constraints of the game. The updated avatar is generated so as to not cause any performance or compatibility issues and to allow the user to have a consistent identity across different games or platforms. The skin The user customized avatar constrained to the game limits of the game can be protected using blockchain. The blockchain has protection features that ensure that the avatar customized with the user inputs is secured and cannot be stolen or copied by anyone else. Further, the blockchain allows establishment of a secondary market for buying, selling, and trading the customized avatars within the game or outside in external marketplaces. The blockchain can be used to create a new economy around the virtual identity while giving the user the ability to express themselves in the game. The decentralized nature of the blockchain technology ensures that the fidelity of the data is maintained. Using the blockchain technology for tracking use of the customized avatar within a game and across various games and platforms is easy, and marketing the customized avatar is efficient as the ownership rights are made clear and transferable. The avatar personalization module 250 can make use of a publicly available or a private blockchain technology to keep track of use and ownership of the customized avatar. An NFT generator module 270 within the avatar personalization module 250 can be used to generate a non-fungible token (NFT) for the customized avatar and record the NFT in a blockchain. As and when changes are made to the customized avatar, be it changes to attributes or to ownership, the NFT is updated on the blockchain, making the tracking easy and complete. When the customized avatar generated in the game is transported to another interactive application (e.g., a second game), a new NFT is generated for the customized avatar in the second game so as to keep track of the usage and customization made to the customized avatar in the second game. Similarly, when multiple versions of the customized avatar are generated (e.g., each version of the customized avatar matching a particular style), each version of the customized avatar may have its own NFT generated and maintained on the blockchain so as to keep track of the usage and ownership of the particular version of the customized avatar. The various implementations allow the user to create their own brand of avatar and use the branded avatar across different applications and platforms so as to have consistent representations of the user across the different applications.

In some implementations, the various sub-modules of the avatar representation module, such as the feature extraction module 256, the input analyzer module 257, the game constraints extraction module 258, the feature mapping module 259, the rendering style detection module 260 and avatar skin generator module 261 may all be part of a generative artificial intelligence (AI) module 255. The generative AI module 255 receives the user inputs from the user, the game constraints retrieved from the various games, the image inputs provided by the user or retrieved from different image sources or capturing devices, and processes the inputs to identify specific ones of the features of a character or entity representation of the user (i.e., an avatar) that are being customized and applies the changes to attributes of the features identified in the customization inputs provided by the user to generate an output image that exhibits the customized features. The customized features of the output image generated in a game may be transported to a different avatar identified in a different game to allow the user to exhibit consistent identity in the different games.

Figure 3:
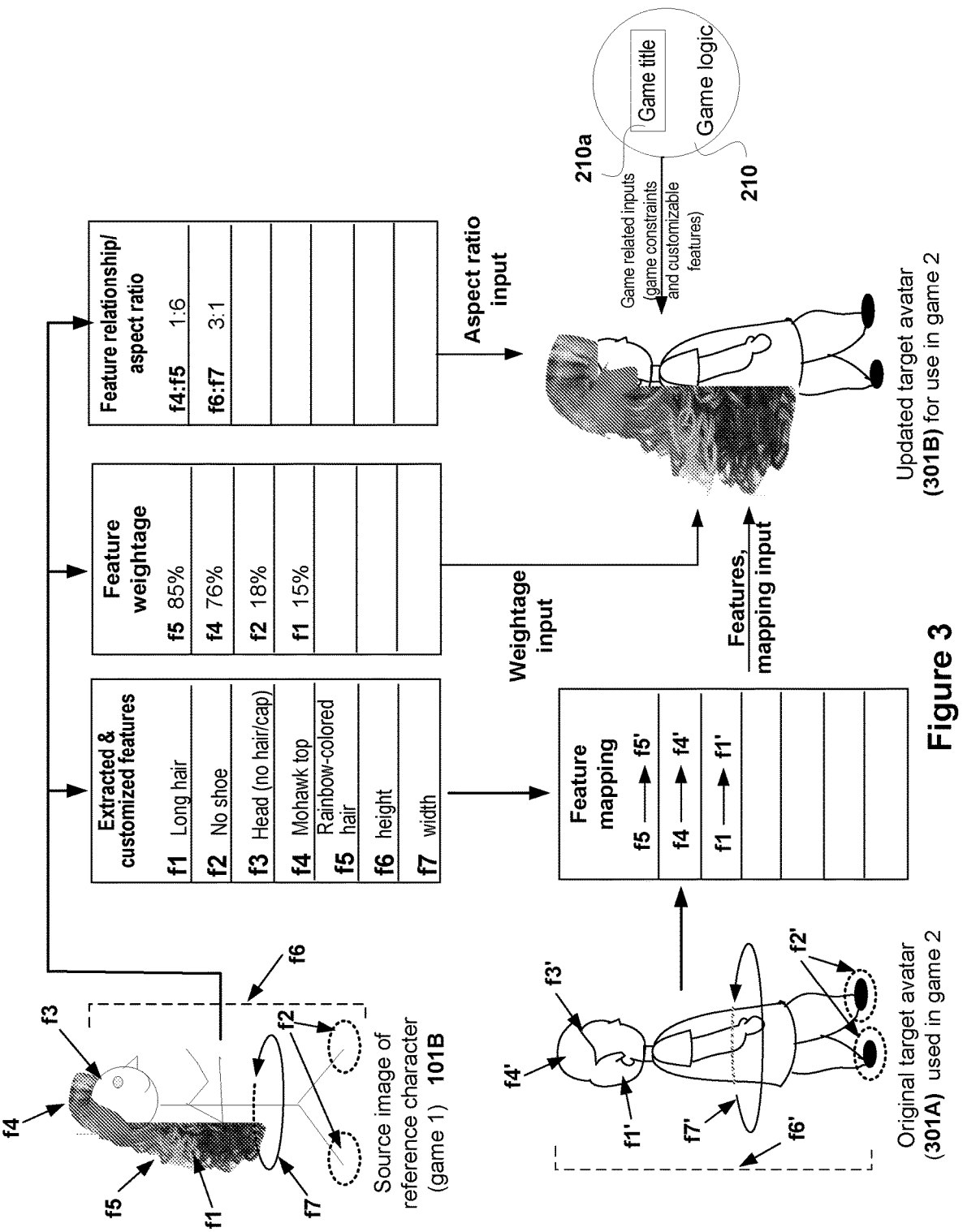
FIG. 3 provides a simplified view of various features of an image that can be used to customize an avatar of a user.

FIG. 3 illustrates the various data used, generated and/or considered by the generative AI module 255 within the avatar personalization module 250 when transporting the features of the customized avatar from a first game to a second game, in some implementations. The avatar personalization module 250 receives a request to transport features of a customized avatar generated or updated in the first game to the second game. Responsive to the request, the avatar personalization module 250 engages the generative AI module 255 to analyze the customized and customizable features of the avatar of the user (i.e., character 101B). As part of analysis, the generative AI module 255 identifies and extracts the customizable features of the character 101B. In some implementations, the features extracted from the character 101B include only customized features (i.e., a sub-set of the customizable features that were already adjusted using the user inputs). In other implementations, the features that are extracted are customizable features, wherein the customizable features include features that are customized and features that are yet to be customized. FIG. 3 illustrates one such example, wherein the features extracted from the customized avatar 101B of the user include features f1 through f7 relating to character representation 101B, wherein features f1-f5 are shown to have been customized and features f6 and f7 are yet to be customized.

The customized features are analyzed to determine a level of saliency associated with each customized feature, wherein the level of saliency, in some implementations, is determined by the amount of influence the customized feature has in making the avatar distinguishable. The level of saliency, in some implementations, can be based on the type of attribute selected to change a particular customizable feature. For example, with reference to the hair feature (i.e., a customizable feature of character 101B), a rainbow color attribute used to adjust the hair feature will make the avatar more distinguishable than a blond color attribute for the hair feature. Similarly, a mohawk top cut in rainbow colors would make the avatar more distinguishable than the mohawk top cut in black color. The weight assignment sub-module 259a (of FIG. 2) determines the type of attribute used to customize a feature and the influence the attribute type has in making he avatar distinguishable and assigns a weight to each feature that has been customized. In the above example, the rainbow-color hair feature (f5) is determined to have greater influence than the mohawk top cut (f4) and so the weight assignment sub-module 259a assigns the feature f5 a greater weight than the feature f4. FIG. 3 shows some of the relative weights assigned to some of the features identified in the character 101B. In some implementations, more than one attribute may be adjusted for a single customizable feature, wherein each attribute by itself can exert a certain amount of influence but the combined attributes can exert a greater influence. In the case where two or more attributes are used to adjust the single feature, the weight assigned to the feature could include the combined weight of the two attributes. The weights assigned to the different features of character (i.e., character features) 101B is provided as weightage inputs to the generative AI module 255 to use when transporting the customized features of the character 101B from one game to a different character or object in a different game/interactive application.

In addition to providing feature weightage as inputs, the avatar personalization module 250 may also provide feature mapping inputs to the generative AI module 255 for processing. The feature mapping module 259 identifies the features of a second character in a second game to which the customizable features of the character 101B of the first game is to be transferred, and maps the relevant features of the character 101B to corresponding features identified in the second character. As the name indicates, the second character can be a character representation selected by the user to represent them in the second game and the features identified for mapping may be features of the character, such as facial features, head, hair, length, height, shoes, etc. FIG. 3 illustrates the target avatar (character representation 301A) identified in game 2 to which the customized attributes of the different features of character 101B is to be transferred, in response to the transport request received from the user. The character 301A could be a game character available in game 2 or a fictitious character associated with the user or an image of or provided by the user. Alternately, the second "character" can be a mythical being (e.g., fire-breathing dragon). In such cases, the features identified for feature mapping correspond to features of the second character (i.e., dragon), such as color, height, length, facial features, etc., of the mythical being. The feature mapping module 259 maps the customizable features identified in character 101B to corresponding features of character 301A. The character 101B in the first game and the character 301A in the second game can include same types of features (e.g., facial features, arms, legs, neck, shoulder, etc.). The game constraints of the first game in which the character 101B is being used may identify a first set of the features of the character 101B as customizable, while the game constraints of the second game in which the character 301A is being used may identify a second set of the features of character 301A as customizable, wherein the features in the first set may or may not match the features in the second set. Consequently, the feature mapping can identify and map those features that are identified in the first set with corresponding features in the second set. FIG. 3 shows one such example of feature mapping done by the feature mapping module 259 for the features that are found to be common in the first and the second sets. The feature mapping details are provided to the generative AI module 255 as features mapping input.

During the mapping of the features, the feature mapping module 259 may also use any relationships found between the different features of the character 101B identified in the first set and provide the relationship details as aspect ratio inputs to the generative AI module 255. For example, the relationships between two features can be a relative proportion of a first feature to that of a second feature. FIG. 3 illustrates some example relationships that may exist between the different features. For example, there may be a relationship between the length of the mohawk top to the length of the hair in character 101B and that relationship is evaluated using the attributes and found to be about 1:6. Another relationship may exist between the height (f6) and width (f7) of the character 101B and that relationship may be found to be about 3:1. Of course, not all the features in a character will have inter-relationships. But where a relationship exists, such relationship is captured by the feature mapping module 259 and provided as aspect ratio input to the generative AI module 255.

The generative AI module 255 also receives the game constraints of the second game. The game constraints of the second game specify the type and extent of customization that can be done for different attributes of each feature. The generative AI module 255 uses the various inputs provided by the avatar personalization module and retrieved from different sources to update select ones of the features of the target character 301A in the second game to generate an output image representing the updated character 301B, in accordance to the game constraints of the second game. As and when new inputs are received at the generative AI module 255, the output image with the customized features are further refined. The generative AI module 255 generates and refines the output image by first classifying the various inputs, prioritizing the various features in accordance to the weights assigned, and applying the customization of different attributes to corresponding features of the character 301 in accordance to the classification and prioritization and the game constraints, so that the resulting output image complies with the game requirements and is in accordance to the game constraints. The output image with the customized features is associated with the user in the second game and is stored separately in the user profile of the user and used for representing the user in the second game. The updated character 301B representing the customized avatar of the user in the second game exhibits the same distinguishable features as the updated character 101B in the first game, enabling the user to maintain a consistent identity across different games (or interactive applications), which can execute across different platforms.

FIG. 4 illustrates components of an example device 400 that can be used to perform aspects of the various embodiments of the present disclosure. This block diagram illustrates a device 400 that can incorporate or can be a personal computer, video game console, personal digital assistant, a server or other digital device, suitable for practicing an embodiment of the disclosure. Device 400 includes a central processing unit (CPU) 402 for running software applications and optionally an operating system. CPU 402 may be comprised of one or more homogeneous or heterogeneous processing cores. For example, CPU 402 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 400 may be a localized to a player playing a game segment (e.g., game console), or remote from the player (e.g., back-end server processor), or one of many servers using virtualization in a game cloud system for remote streaming of gameplay to clients.

Memory 404 stores applications and data for use by the CPU 402. Storage 406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 408 communicate user inputs from one or more users to device 400, examples of which may include keyboards, mice, joysticks, touch pads, touch screens, still or video recorders/cameras, tracking devices for recognizing gestures, and/or microphones. Network interface 414 allows device 400 to communicate with other computer systems via an electronic communications network, and may include wired or wireless communication over local area networks and wide area networks such as the internet. An audio processor 412 is adapted to generate analog or digital audio output from instructions and/or data provided by the CPU 402, memory 404, and/or storage 406. The components of device 400, including CPU 402, memory 404, data storage 406, user input devices 408, network interface 414, and audio processor 412 are connected via one or more data buses 422.

A graphics subsystem 420 is further connected with data bus 422 and the components of the device 400. The graphics subsystem 420 includes a graphics processing unit (GPU) 416 and graphics memory 418. Graphics memory 418 includes a display memory (e.g., a frame buffer) used for storing pixel data for each pixel of an output image. Graphics memory 418 can be integrated in the same device as GPU 416, connected as a separate device with GPU 416, and/or implemented within memory 404. Pixel data can be provided to graphics memory 418 directly from the CPU 402. Alternatively, CPU 402 provides the GPU 416 with data and/or instructions defining the desired output images, from which the GPU 416 generates the pixel data of one or more output images. The data and/or instructions defining the desired output images can be stored in memory 404 and/or graphics memory 418. In an embodiment, the GPU 416 includes 3D rendering capabilities for generating pixel data for output images from instructions and data defining the geometry, lighting, shading, texturing, motion, and/or camera parameters for a scene. The GPU 416 can further include one or more programmable execution units capable of executing shader programs.

The graphics subsystem 420 periodically outputs pixel data for an image from graphics memory 418 to be displayed on display device 410. Display device 410 can be any device capable of displaying visual information in response to a signal from the device 400, including CRT, LCD, plasma, and OLED displays. Device 400 can provide the display device 410 with an analog or digital signal, for example.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (Saas). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the operations may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet. It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input.

Gestures such as swipes in particular directions or specific touch motions may also be detected as game inputs. In one embodiment, a tutorial can be provided to the user indicating how to provide input via the touchscreen for gameplay, e.g., prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g., accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g., accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g., feedback data) from the client device or directly from the cloud gaming server.

In one embodiment, the various technical examples can be implemented using a virtual environment via a head-mounted display (HMD). An HMD may also be referred to as a virtual reality (VR) headset. As used herein, the term "virtual reality" (VR) generally refers to user interaction with a virtual space/environment that involves viewing the virtual space through an HMD (or VR headset) in a manner that is responsive in real-time to the movements of the HMD (as controlled by the user) to provide the sensation to the user of being in the virtual space or metaverse. For example, the user may see a three-dimensional (3D) view of the virtual space when facing in a given direction, and when the user turns to a side and thereby turns the HMD likewise, then the view to that side in the virtual space is rendered on the HMD. An HMD can be worn in a manner similar to glasses, goggles, or a helmet, and is configured to display a video game or other metaverse content to the user. The HMD can provide a very immersive experience to the user by virtue of its provision of display mechanisms in close proximity to the user's eyes. Thus, the HMD can provide display regions to each of the user's eyes which occupy large portions or even the entirety of the field of view of the user, and may also provide viewing with three-dimensional depth and perspective.

In one embodiment, the HMD may include a gaze tracking camera that is configured to capture images of the eyes of the user while the user interacts with the VR scenes. The gaze information captured by the gaze tracking camera(s) may include information related to the gaze direction of the user and the specific virtual objects and content items in the VR scene that the user is focused on or is interested in interacting with. Accordingly, based on the gaze direction of the user, the system may detect specific virtual objects and content items that may be of potential focus to the user where the user has an interest in interacting and engaging with, e.g., game characters, game objects, game items, etc.

In some embodiments, the HMD may include an externally facing camera(s) that is configured to capture images of the real-world space of the user such as the body movements of the user and any real-world objects that may be located in the real-world space. In some embodiments, the images captured by the externally facing camera can be analyzed to determine the location/orientation of the real-world objects relative to the HMD. Using the known location/orientation of the HMD the real-world objects, and inertial sensor data from the, the gestures and movements of the user can be continuously monitored and tracked during the user's interaction with the VR scenes. For example, while interacting with the scenes in the game, the user may make various gestures such as pointing and walking toward a particular content item in the scene. In one embodiment, the gestures can be tracked and processed by the system to generate a prediction of interaction with the particular content item in the game scene. In some embodiments, machine learning may be used to facilitate or assist in said prediction. During HMD use, various kinds of single-handed, as well as two-handed controllers can be used. In some implementations, the controllers themselves can be tracked by tracking lights included in the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment or metaverse rendered on an HMD. In some cases, the HMD can be wirelessly connected to a cloud computing and gaming system over a network. In one embodiment, the cloud computing and gaming system maintains and executes the video game being played by the user. In some embodiments, the cloud computing and gaming system is configured to receive inputs from the HMD and the interface objects over the network. The cloud computing and gaming system is configured to process the inputs to affect the game state of the executing video game. The output from the executing video game, such as video data, audio data, and haptic feedback data, is transmitted to the HMD and the interface objects. In other implementations, the HMD may communicate with the cloud computing and gaming system wirelessly through alternative mechanisms or channels such as a cellular network.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations. It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

In one embodiment, the video game is executed either locally on a gaming machine, a personal computer, or on a server. In some cases, the video game is executed by one or more servers of a data center. When the video game is executed, some instances of the video game may be a simulation of the video game. For example, the video game may be executed by an environment or server that generates a simulation of the video game. The simulation, on some embodiments, is an instance of the video game. In other embodiments, the simulation maybe produced by an emulator. In either case, if the video game is represented as a simulation, that simulation is capable of being executed to render interactive content that can be interactively streamed, executed, and/or controlled by user input.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A computer-implemented method comprising:
identifying at least one feature of an avatar associated with a user, wherein the at least one feature of the avatar is modifiable;
receiving an input for modifying the at least one feature of the avatar;
modifying the at least one feature based at least in part on the input;
identifying compatibility requirements of a game, wherein the compatibility requirements define limitations of the game for modifying the avatar; and
updating a display of the avatar by modifying the at least one feature based at least in part on the compatibility requirements of the game.

2. The method of claim 1, further comprising:
modifying the at least one feature to make the avatar distinguishable; and
designating the at least one feature as a hallmark feature of the avatar.

3. The method of claim 2, wherein the hallmark feature is designated by a system used for modifying the avatar based at least in part on the feature and a type of customization applied to the feature.

4. The method of claim 1, wherein the avatar associated with the user is generated from an image of the user, and wherein the image of the user is generated as a three-dimensional image.

5. The method of claim 1, wherein the avatar associated with the user is generated from a game icon or a picture of a character provided by the user, and wherein the game icon or the picture of the character is converted into a three-dimensional image.

6. The method of claim 1, wherein identifying the at least one feature includes identifying three-dimensional attributes of the at least one feature of the avatar.

7. The method of claim 1, wherein identifying the at least one feature includes extracting two-dimensional attributes of the at least one feature of the avatar.

8. The method of claim 1, wherein the avatar is transportable to a second game.

9. The method of claim 3, further comprising:
assigning a weight to each of the at least one feature of the avatar, wherein the weight is indicative of a salience of the at least one feature, wherein the saliency is based on a type of modification applied to the at least one feature,
wherein the feature with a highest weight amongst the at least one feature is designated as the hallmark feature.

10. The method of claim 8, further comprising:
detecting a request to transport the avatar from a first game to the second game; and
in response to the request, transporting the avatar to the second game, wherein the transportation of the avatar to the second game includes transporting a hallmark feature of the avatar to a first feature of a character identified in the second game, wherein the character is associated with the user.

11. The method of claim 10, wherein transporting the hallmark feature of the avatar includes modifying the first feature to correspond with the hallmark feature, the modification performed upon successful verification that the first feature is modifiable in the second game, wherein the modification of the first feature is based at least in part on the compatibility requirements of the second game, the first feature being designated as the hallmark feature of the character to distinctly identify the user in the second game.

12. The method of claim 10, wherein transporting the avatar further comprises:

identifying the compatibility requirements of the second game, wherein the compatibility requirements of the second game identify features of the character that are modifiable in the second game and an amount of modification that can be performed to the features of the character for the second game;

mapping the at least one feature from the avatar to the features of the character identified as modifiable in the second game; and modifying the features of the character, wherein the modification includes scaling the features of the character to match with the scaling of the at least one feature identified in the avatar.

13. The method of claim 12, wherein the scaling of the features of the character includes adjusting aspect ratios of the features of the character in the second game so as to match with corresponding aspect ratios of the at least one feature of the avatar.

14. The method of claim 1, further comprising:

generating a non-fungible token (NFT) in a blockchain for the avatar, the NFT capturing the at least one feature of the avatar and the modification of the at least one feature of the avatar, wherein the NFT keeps track of modifications to the at least one feature of the avatar.

15. The method of claim 1, wherein updating the display of the avatar includes generating a plurality of updated avatars with a hallmark feature designated in the avatar, wherein each updated avatar of the plurality of updated avatars corresponds to a distinct style used for rendering.

16. The method of claim 1, wherein identifying the at least one feature includes identifying three-dimensional attributes of the at least one feature of the avatar.

17. The method of claim 1, wherein the input includes text inputs, the text inputs identifying at least a second game to transport the avatar to and a style of the second game, and wherein the text inputs are interpreted and a hallmark feature of the avatar adjusted to comply with the style specified for the second game.

18. A computer-implemented method comprising:

receiving a request to transport an avatar associated with a user from a first game to a second game, wherein the avatar includes at least one modified feature and at least one hallmark feature used to distinctly identify the user from other users; and in response to the request, transporting the avatar to the second game, wherein transporting the avatar includes modifying the at least one modified feature and the at least one hallmark feature based at least in part on rendering constraints associated with the second game.

19. The method of claim 18, wherein transporting the avatar associated with the user further comprises:

identifying a relationship between two or more features of the avatar in the first game;

mapping the two or more features of the avatar of the first game with corresponding character features of a character in the second game, wherein the character features of the character are identified to be modifiable in the second game; and updating the character features of the character based at least in part on the two or more features of the avatar, the character features of the character updated in accordance to the relationship defined between the two or more features of the avatar and in accordance to compatibility requirements of the second game, wherein the relationship between the two or more features of the avatar is used to define a scaling factor, and the character features of the character in the second game are updated based at least in part on the scaling factor defined between the two or more features of the avatar.

20. The computer-implemented method of claim 18, further comprising:

designating at least one feature identified to be the hallmark feature of the avatar based at least in part on compatibility requirements of the second game, wherein the hallmark feature is used to distinctly identify a user associated with the avatar.

* * * * *